United States Patent
Boden et al.

[11] Patent Number: 6,167,444
[45] Date of Patent: Dec. 26, 2000

[54] METHOD AND SYSTEM FOR EXCHANGING ROUTING INFORMATION

[75] Inventors: Edward Barnes Boden; Paul Albert Gebler, Jr.; Franklin Alfred Gruber, all of Vestal, N.Y.

[73] Assignee: International Business Machines Corporation, Armonk, N.Y.

[21] Appl. No.: 09/075,044

[22] Filed: May 8, 1998

[51] Int. Cl.⁷ .................................................. G06F 13/00
[52] U.S. Cl. ................... 709/223; 709/224; 709/225; 709/238; 709/249
[58] Field of Search ................... 709/223, 224, 709/225, 235, 238, 249, 250, 239, 240, 241, 242; 370/390, 401; 713/201

[56] References Cited

U.S. PATENT DOCUMENTS

| | | | |
|---|---|---|---|
| 5,420,862 | 5/1995 | Perlman | 370/85.13 |
| 5,426,637 | 6/1995 | Derby et al. | 370/85.13 |
| 5,553,083 | 9/1996 | Miller | 371/32 |
| 5,612,959 | 3/1997 | Takase et al. | 370/390 |
| 5,678,004 | 10/1997 | Thaweethai | 713/201 |
| 5,802,285 | 9/1998 | Hirviniemi | 709/250 |
| 5,802,316 | 9/1998 | Ito et al. | 709/249 |
| 5,835,720 | 11/1998 | Nelson et al. | 709/224 |
| 5,917,997 | 6/1999 | Bell et al. | 713/201 |
| 5,920,699 | 7/1999 | Bare | 709/225 |
| 5,951,650 | 9/1999 | Bell et al. | 709/238 |
| 5,963,540 | 10/1999 | Bhaskaran | 370/218 |
| 5,983,281 | 11/1999 | Ogle et al. | 709/249 |
| 5,987,515 | 11/1999 | Ratcliff et al. | 709/224 |

OTHER PUBLICATIONS

Network Working Group, *Routing Information Protocol*, Request for Comments (RFC) 1058, Jun. 1988, pp. 1–33.
Network Working Group, *RIP Version 2 Carrying Additional Information*, Request for Comments (RFC) 1723, Nov. 1994, pp. 1–9.

*Primary Examiner*—Dung C. Dinh
*Assistant Examiner*—Abdullahi E. Salad
*Attorney, Agent, or Firm*—Shelley M Beckstrand

[57] ABSTRACT

A host computer is operated as a gateway interfacing a plurality of network interfaces in a communication system including local area networks and wide area networks. A redistribution parameter is maintained in a configuration file for each of a plurality of network interfaces, with the redistribution parameter defaulted to *full for local area network interfaces and to *limited for wide area network interfaces. Responsive to receiving a routing update (a route) from a wide area network interface, the route is advertised to interfaces having a redistribution parameter of *full and not to those interfaces having a redistribution parameter of *limited.

10 Claims, 5 Drawing Sheets

METHOD AND SYSTEM FOR EXCHANGING ROUTING INFORMATION

BACKGROUND OF THE INVENTION

1. Technical Field of the Invention

This invention relates to communications protocols, and more particularly a system and method for exchanging routing information among gateways and hosts and local and wide area networks.

2. Background Art

The Routing Information Protocol (RIP) is a defacto standard for the exchange of routing information among gateways and hosts. Two such standards are the RIP-1 and RIP-2. RIP-1 is described in Network Working Group, *Routing Information Protocol*, Request for Comments (RFC) 1058, June 1988, pages 1–33. RIP-2 is described in Network Working Group, *RIP Version 2 Carrying Additional Information*, RFC 1723, November 1994, pages 1–9.

The Internet is organized into a number of networks connected by gateways. The networks may be either point-to-point links or more complex networks such as Ethernet or the ARPANET. Hosts and gateways are presented with IP datagrams addressed to some host. Routing is the method by which the host or gateway decides where to send the datagram. It may be able to send the datagram directly to the destination, if that destination is on one of the networks that are directly connected to the host or gateway. When the destination is not directly connected, and thus not directly reachable, the host or gateway attempts to send the datagram to a gateway that is nearer the destination. The goal of a routing protocol is to supply the information that is needed to do routing. (See Network Working Group, *Routing Information Protocol*, Request for Comments (RFC) 1058, June 1988, pp. 2–3.)

Routing is the task of finding a path from a sender to a desired destination. This may be viewed as a matter of finding gateways between networks. Internet protocol (IP) routing deals with communicating messages from a sender on one such network to a destination on a different one. In that case, the message must pass through gateways connecting the networks. If the networks are not adjacent, the message may pass through several intervening networks and the gateways connecting them. A "network" may cover a single broadcast network (e.g., an Ethernet), a point to point line, or the ARPANET. A network is treated as a single entity by IP. Either no routing is necessary (as with a point to point line), or routing is done in a manner transparent to IP, allowing IP to treat the entire network as a single full-connected system (as with Ethernet or the ARPANET.) When using the term "network" in connection with IP addressing, a single network number may be assigned to a collection of networks, with "subnet" addressing used to describe the individual networks.

One of several approaches for finding routes between networks is based on distance vector algorithms. In this approach, each entity (gateway or host) that participates in the routing protocol is assumed to keep in a routing database information about all of the destinations within the system. Each entry in this routing database includes the next gateway to which datagrams destined for the entity should be sent and a "metric" measuring the total distance to the entity. Distance is a generalized concept which may also cover the time delay in getting messages to the entity or the dollar cost of sending messages to it. Routing information is exchanged only among entities that are adjacent; that is, entities that share a common network.

A typical routing database implementation includes the following information about each destination:

address: in IP implementations, this will be the IP address of the host or network.

gateway: the first gateway along the route to the destination.

interface: the physical network which must be used to reach the first gateway.

metric: a number, indicating the distance to the destination.

timer: the amount of time since the entry was last updated.

This database is initialized with a description of the entities that are directly connected to the system. It is updated according to information received in messages from neighboring gateways. Each entity participating in the routing scheme sends update messages that describe the routing database as it currently exists in that entity. Optimal routes for the entire system may be maintained using only information obtained from neighboring entities.

Distance vector algorithms are based on a table giving the best route to every destination in the system. A metric is used to define "best". In simple networks it is common to use a metric that simply counts how many gateways a message must go through (sometimes referred to as the number of hops.) In more complex networks, a metric may be chosen to represent the total amount of delay the message suffers, the cost of sending it, or some other quantity which may be minimized. In each approach, the metric represents a sum of costs for individual hops.

A host or gateway G keeps, for each destination in the system a current estimate of the metric for that destination and the identity of the neighboring gateway on whose data that metric is based. If the destination is on a network that is directly connect to gateway G, then G uses an entry that shows the cost of using the network, and the fact that no gateway is needed to get to the destination. This combination of destination, metric, and gateway is typically referred to as a route to the destination with that metric, using that gateway.

Periodically, each gateway or host sends a routing update to every neighbor. The update is a set of messages that contain all of the information from the routing table. (The format of a RIP-1 message is shown in FIG. 3, and that of a RIP-2 message in FIG. 3.) It contains an entry for each destination, with the distance shown to that destination. When a routing update arrives from a neighbor G', this gateway G adds the cost associated with the network that is shared with G' (the network over which the update arrived), and the result compared with the current entry in this gateway's routing table for the destination. If the metric is less, the table entry is updated to the new metric and gateway.

It is an object of the invention to provide an improved method and system for operating a router in a RIP system while limiting the communication of datagrams through a particular gateway.

It is a further object of the invention to limit the communication of datagrams by way of a route through a particular gateway having a relatively lower metric to avoid overuse of a particular host by increasing usage of routes with higher metrics.

It is a further object of the invention to enable a router to support a RIP environment implementing a distance vector algorithm while restricting routes through that router.

It is an object of the invention to provide a method and system supporting a routing information protocol (RIP)

based upon a least cost algorithm for exchanging routing information while restricting routes over wide area network interfaces.

SUMMARY OF THE INVENTION

In accordance with the invention, a host is operated as a gateway interfacing a plurality of network interfaces in a communication system. A redistribution parameter is maintained in a configuration file for each of a plurality of network interfaces, with the redistribution parameter defaulted to *full for local area network interfaces and to *limited for wide area network interfaces. Responsive to receiving a routing update (a route) from a wide area network interface, the route is advertised to interfaces having a redistribution parameter of *full and not to those interfaces having a redistribution parameter of *limited.

BEST MODE FOR CARRYING OUT THE INVENTION

This invention provides a method and system is for establishing routing paths among offices within a system including both wide area networks (WANs) and local area networks (LANs), while minimizing undesired routing traffic through a particular gateway.

Figure 1:
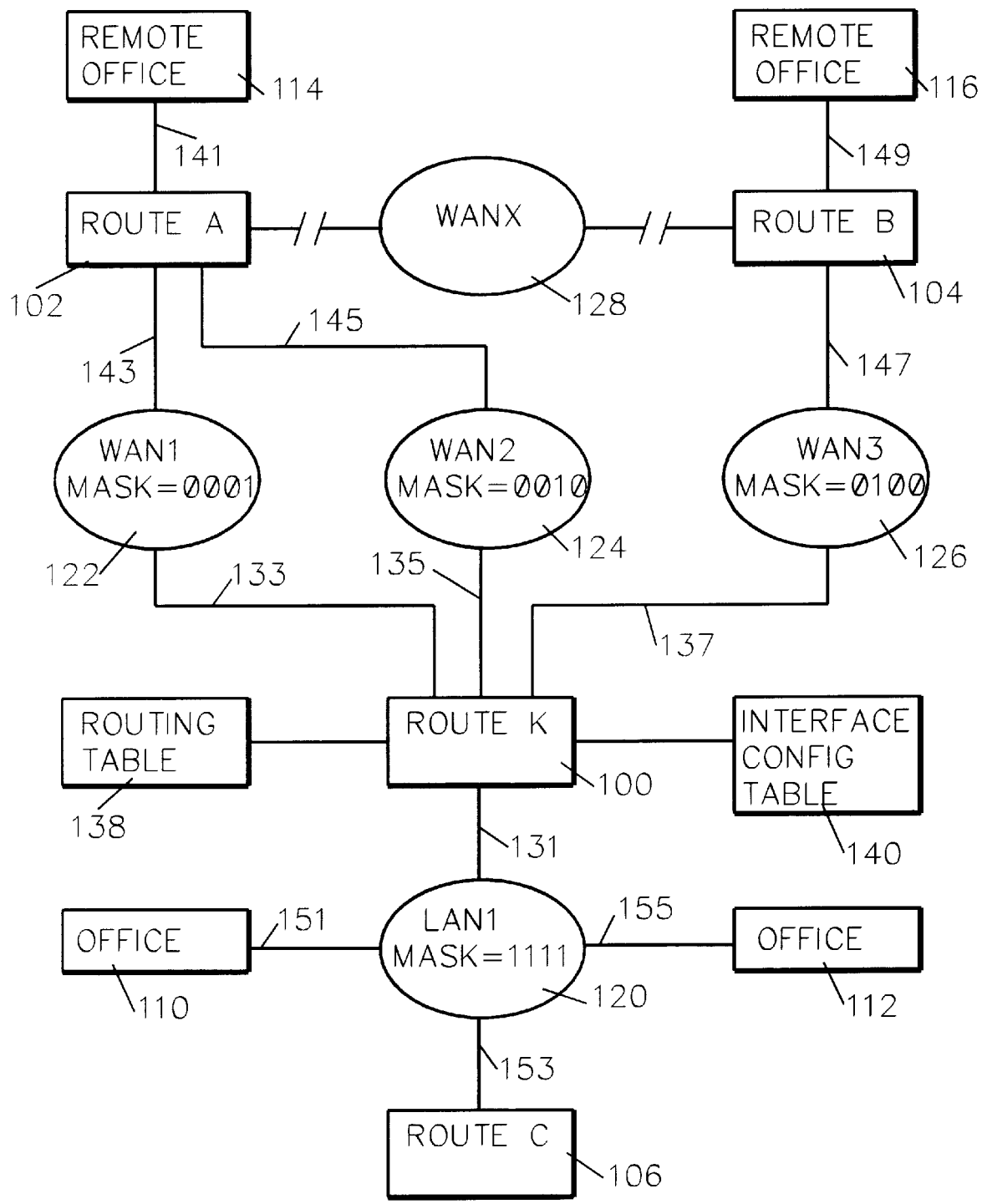
FIG. 1 is a system diagram illustrating the system of the invention.

Referring to FIG. 1, router 100, router 106 and remote offices 110 and 112 are connected to local area network LAN1 120 by interfaces represented by lines 131, 153, 151 and 155 respectively. Router 100 is a host which functions as a router, and may be, for example, an IBM AS/400 system. Each router, such as router 100, has a routing table 138 and an interface configuration table 140. Router 100 also interfaces, as is represented by lines 133, 135 and 137, wide area networks WAN1 122, WAN2 124 and WAN3 126. Remote office 114 interfaces, as represented by line 141, to router 102 which interfaces as represented by lines 143 and 145 to WAN1 122 and WAN2 124, and to router 104 through one or more other routers represented by wide area network WANX 128. Remote office 116 interfaces, as is represented by line 149, to router B 104, which also interfaces, as is represented by line 147, to WAN3 126.

Wide area networks (WANs) 122, 124, and 126 implement, for example, a point to point protocol (PPP) or frame relay protocol. Local area network (LAN) 120 may implement, for example, a token ring or ethernet protocol.

In a manner to be described hereafter, router 102 advertises to all connected gateways that it can access remote office 114, router 104 advertises that it can access remote office 116, and router 100 advertises that it can access remote offices 114 and 116 and to offices 110 and 112 on LAN 120. However, there may be circumstances where router 100 is a host system not intended to serve as a router to the entire system. That is, were router 100 to advertise to router 104 that it, router 100, can access remote office 114, and if the metric associated with the path through WAN 126 to router 100 and through WAN 122 is less than that known to router 104 through WANs 128, then router 104 would typically be expected to direct its datagrams or messages to remote office 114 through router 100. In accordance with the invention, a manner is provided for causing router 104 to direct its messages to remote offices such as 114 through WANs 128 rather than WANs 126 and 122, even though the metric associated with the path 126, 137, 100, 133, 122, 143, 102 and 141 may be less than the metric associated with path 128, 102, 141. (In this specific example, WAN 128 represents a series of routers in excess of the number of routers along the path through routers 100 and 102.)

The Routing Information Protocol (RIP) protocols for exchanging routing information use a distance vector algorithm to determine the best routing path. In RIP-1, the distance vector algorithm is described along with methods for dealing with changes in topology and for preventing instability. In RIP-2, a compatible upgrade to RIP-1, methods for routing between subnets with different subnet masks, support for classless inter-domain routing, authentication, and multicast transmission are provided. RIP-1 is described in RFC 1058, supra, and RIP-2 is described in RFC 1723.

RIP-1 is a distance vector protocol implemented by hosts and gateways, such as routers 100, 102, 104, 106, to exchange information for computing routes through an IP-based network. (The terms, "host", "router" and "gateway" may be used interchangeably, to refer to another or to all.) RIP-1 is used to convey information about routes to destinations, which may be individual hosts, networks, or a special destination used to convey a default route.

If a gateway crashes, then it has no way of notifying neighbors of a change. Therefore, in RIP-1 every gateway that participates in routing sends (that is, advertises) an update message to all its neighbors every 30 seconds. If a current route for network N uses gateway G, if gateway G is not heard from for, say, 180 seconds, gateway G may be assumed to have crashed or become unusable. The route to N through G is marked as invalid, and when another neighbor that has a valid route to N is heard from, the valid route replaces the invalid one. Also, a RIP-1 router notifies (that is, advertises to) neighbor (directly attached to it) routers that there isn't a valid route to some network by marking that network as unreachable in a normal update message. This is done by assigning a specific metric value chosen to indicate an unreachable destination. That value is normally referred to as "infinity", since it is larger than the largest valid metric and, in RIP-1, infinity is represented by a metric value of 16. The processes of operating all gateways to converge on a routing metric of 16 for an unreachable destination is referred to as "counting to infinity", and may take considerable time.

In order to stop counting to infinity as soon as possible, RIP-1 uses the techniques of "split horizon with poisoned reverse" and "triggered updates."

"Split horizon" is a scheme for avoiding problems caused by including routes in updates sent to the gateway from which they were learned. This prevents routing loops (mutual deception) that involve only two gateways. The "simple split horizon" scheme omits routes learned from one neighbor in updates sent to that neighbor. "Split horizon with poisoned reverse" includes such routes in updates, but sets their metrics to infinity. Either approach may be used by implementers of RIP-1.

"Triggered updates" deals with patterns in which three gateways are engaged in mutual deception by requiring that whenever a gate changes the metric for a route it immediately (within some very small delay) sends an update message, even if it is not yet time for one of the regular update messages. If triggered updates happen quickly enough, even though scheduled updates continue to occur, orphaned remnants of a faulty route should not be reestablished. However, counting to infinity is still possible.

Any host that uses RIP-1 is assumed to have interfaces to one or more networks, and these are referred to as its "directly-connected networks." For example, the directly-connected networks for gateway 100 include WANs 122, 124, 126 and LAN 120. Such hosts have a routing table with one entry for every destination that is reachable through the system described by RIP.

Figures 2, 5:
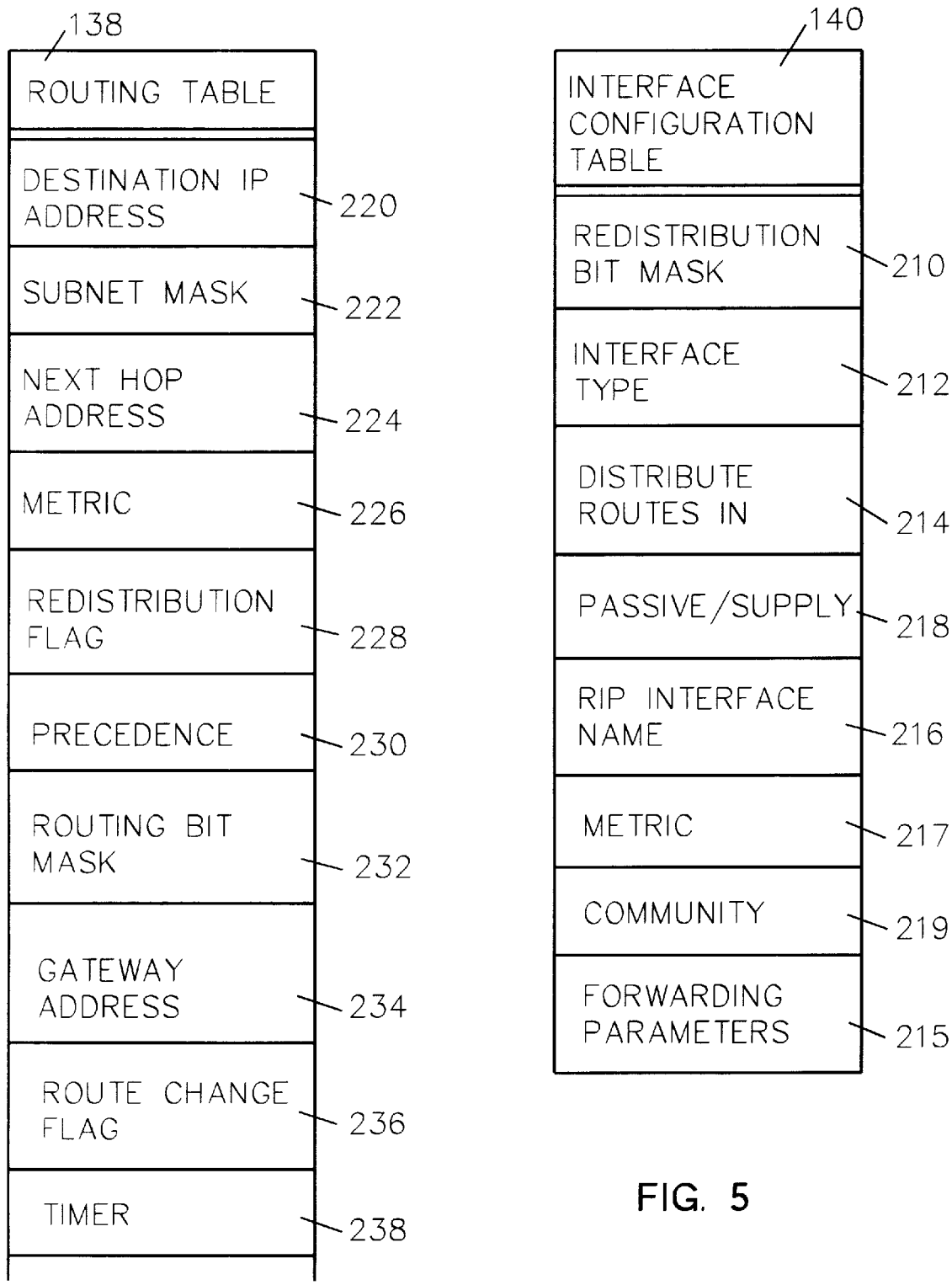
FIG. 2 is a representation of a routing table in accordance with a preferred embodiment of the invention.
FIG. 5 is a representation of an interface configuration table in accordance with a preferred embodiment of the invention.

Referring to FIG. 2, an example routing table 138 includes the following:

The IP address 220 of the destination.

A subnet mask 222.

A next hop address 224.

A metric 226, which represents the total cost of getting a datagram from the host to that destination. This metric is the sum of the costs associated with the networks that would be traversed in getting to the destination. In RIP-1 implementations, 1 is always used for the cost, and this metric reduces to a hop-count.

A redistribution flag 228.

A precedence indicator field 230.

The IP address 234 of the next gateway along the path to the destination. If the destination is on one of the directly-connected networks, this item is not needed.

A route change flag 236 to indicate that information about the route has changed recently.

Various timers 238 associated with the route.

Each host that uses RIP has a routing process that sends and receives datagrams on UDP port number 520. Unsolicited routing update messages have both the source and destination port equal to 5420. Those sent in response to a request are sent to the port from which the request came. A silent RIP process is one that normally does not send out any messages, but merely listens to messages sent by others, and may be used by hosts that do not act as gateways but wish to keep their internal routing tables up to date.

Figure 3:
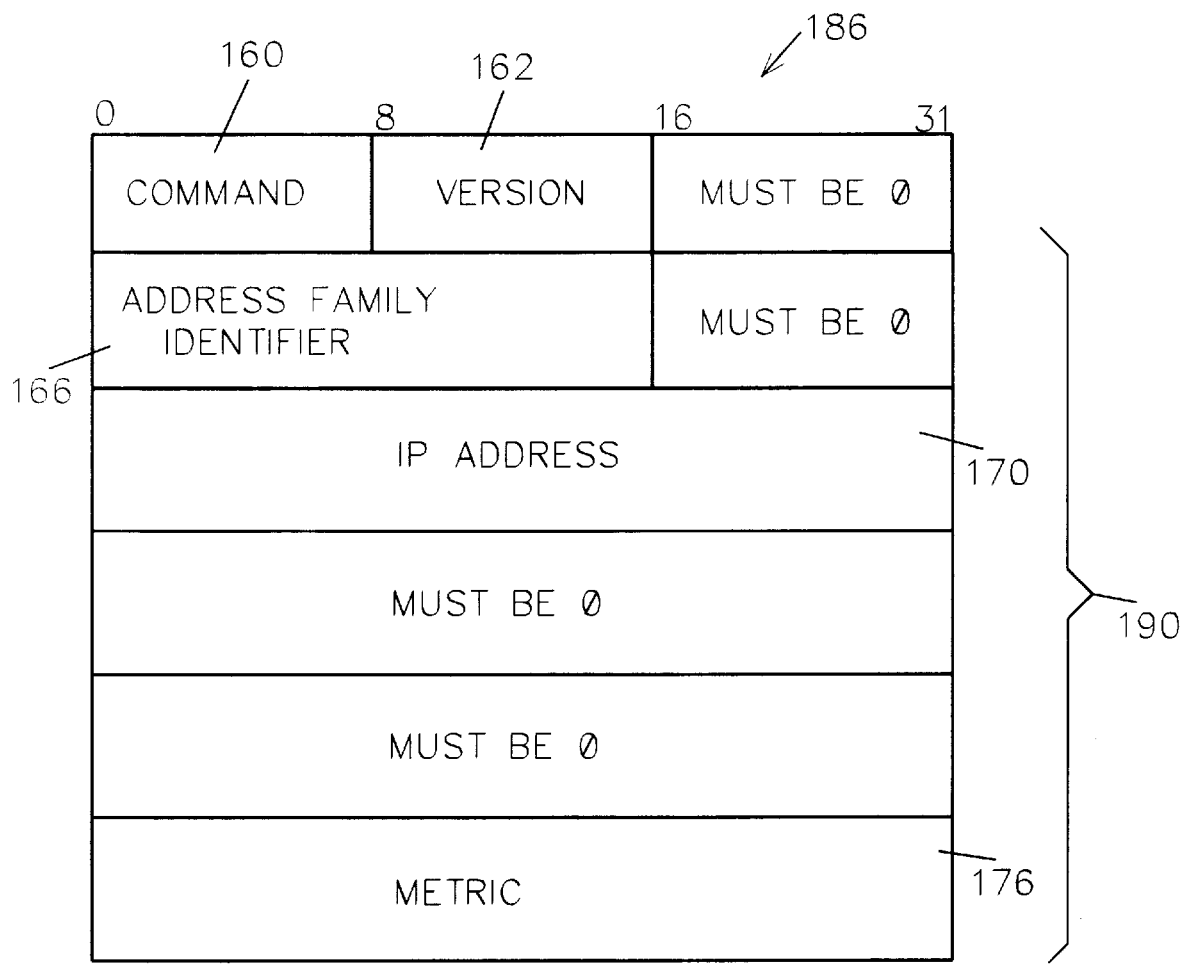
FIG. 3 is a representation of the format of a datagram containing network information according to RIP-1.

The format used by RIP-1 for datagrams 186 containing network information is illustrated in FIG. 3. The portion of the datagram from address family identifier 166 through metric 176 may appear for up to 25 times. IP address 170 is the 4-octet Internet address, in network order.

RIP-1 (version field 162 set to "1") implements the following commands 160:
1. Request A request for the responding system to send all or part of its routing table.
2. Response A message containing all or part of the sender's routing table. This message may be sent in response to a request or poll, or it may be an update message generated by the sender.
3. Traceon Obsolete.
4. Traceoff Obsolete.
5. Reserved May safely be ignored.

For request and response commands 160, the rest of the datagram 186 contains a list of destinations, with information about each. Each entry in this list contains a destination network or host, and the metric for it. In order to accommodate several different protocols, RIP includes in each entry a family identifier 166 which, for IP is 2.

As implemented in RIP-1, distance vector routing can be used to describe routes to individual hosts or to networks. Destinations appearing in request and response messages can be networks, hosts, or a special code used to indicate a default address. Address fields can contain a host address, a subnet number, a network number, or 0, indicating a default route. Thus, when routing a datagram, its destination address is first checked against the list of host addresses; it is then checked to see whether it matches any known subnet or network number; and finally, if none of these match, a default route is used. A host's interpretation of an address received via RIP depends upon whether it knows the subnet mask that applies to the net. If so, then it is possible to determine the meaning of the address. Normally, hosts only know the subnet masks for directly-connected networks.

In accordance with RIP-1, datagrams 186 received on UDP port 520 are handled by a host 100 as follows. The version number 162 is checked. Those with version numbers of zero are ignored. Those whose with version numbers of "1" are ignored if any field designated as "must be zero" contains a non-zero entry; else, it is processed. Those with a version number 162 greater than 1 are processed, but any fields described as "must be zero" are ignored. After the version number is checked, processing depends upon the value in the command field 160.

Responses may be received in response to a specific query, as a regular update, or as a triggered update triggered by a metric change. Processing is the same for each case. First, the response 186 is validated as a whole. It mast be received from a directly connected network (other than itself). Second, each entry 190 (each entry 190 includes fields 166, 170 and 176) is processed. The entry is validated (metric 176 equals 16 or less, the address identifier 166 equals 2, the address is appropriate, and "must be zero" fields are set to zero.) Third, the metric 176 is updated by adding the cost of the network on which the message arrived. (If the result is greater than 16, then metric 176 will be set to 16.) Fourth, the IP address 170 is used to access routing table 138 to determine if an entry already exists with matching IP address 220, and if not, an entry is added to table 138 (unless the metric is 16) by (1) setting the destination 220 and metric 226 to those from the datagram 186, setting the gateway 234 to be the host from which the datagram 186 came, initializing the timeout 238 for the route, setting the route change flag 236 and signaling the output process to trigger an update. Fifth, if there is an existing route (an IP address 220 is found which matches IP address 170), (1) if this datagram 186 is from the same gateway as the existing route (gateway address 234), time out 238 is reinitialized; (2) if the datagram 186 is from the same gateway as the existing route and the new metric 226 (metric 176 plus the metric for this gateway) is different than the old one, or if the new metric is lower than the old one, adopt the route (that is, set gateway address 234 to the interface) from the datagram 186, initialize the timeout 238 for the route, set the route change flag 236 and signal the output process to trigger an update, and if the new metric 226 is 16 (infinity), start the deletion process.

Output processing creates a response message that contains all or part of the routing table. This processing is triggered by input processing when a request is seen, by timed, regular routing updates, or by triggered updates. Split horizon processing may be done, as may be simple split horizon or split horizon with poisoned reverse. Control functions may also be implemented to limit the set of networks allowed in update messages, or to limit the hosts and gateways from which information will be accepted or to which it will be provided.

Figure 4:
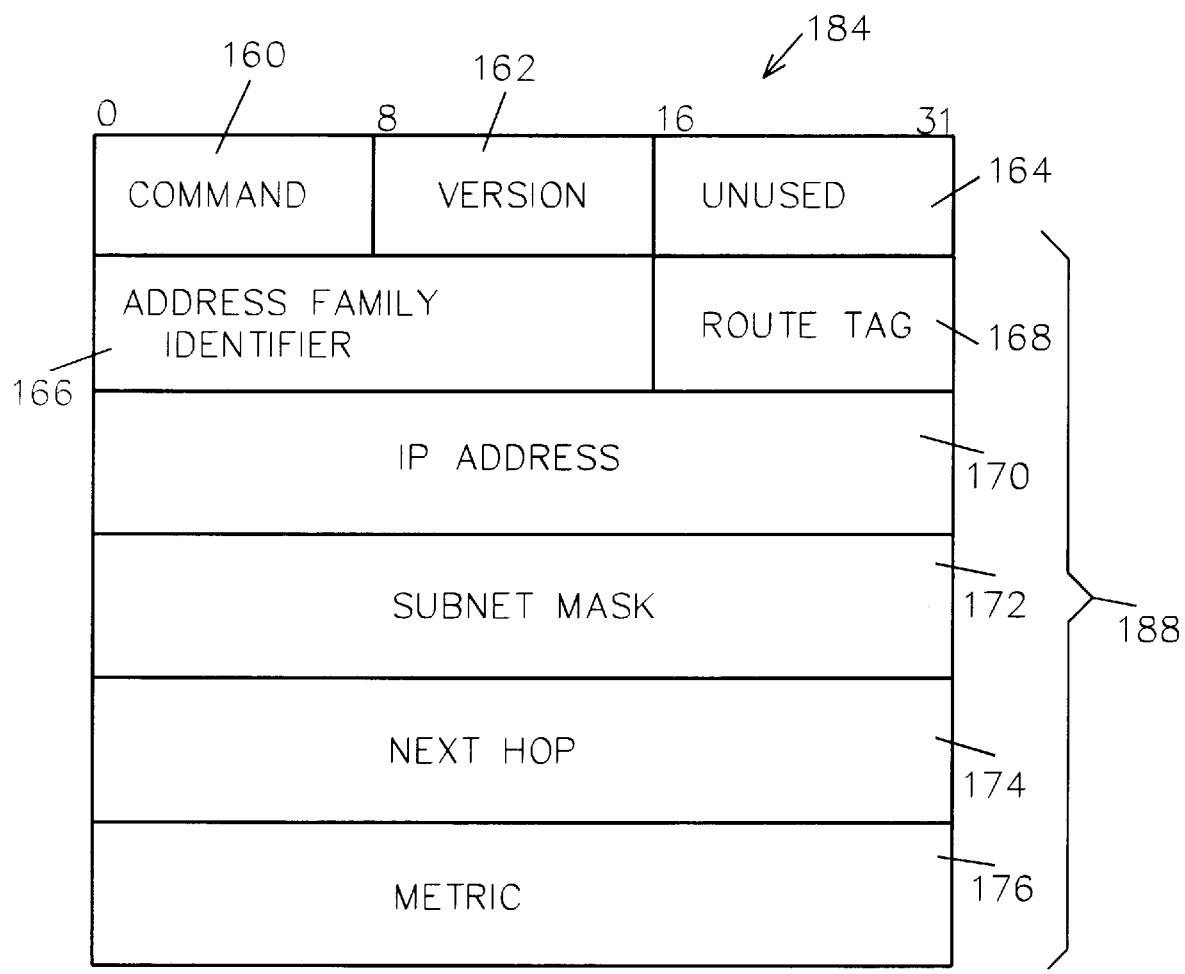
FIG. 4 is a representation of the format of a datagram containing network information according to RIP-2.

Referring to FIG. 4, RIP-2 specifies an extension to the Routing Information Protocol (RIP-1) to expand the amount of useful information carried in RIP messages 184. The RIP-2 RIP message 184 format includes command field 160, version field 162, unused field 164, address family identifier field 166, route tag field 168, IP address field 170, subnet mask field 172, next hop 174 and metric field 176.

The first four octets, fields 160, 162 and 164 comprise the header, and the remainder of the message comprises 1 to 25 route entries 188 of 20 octets each, including for each entry 188 fields 166, 168, 170, 172, 174 and 176. The command 160, address family identifier (AFI) 166, IP address 170 and metric 176 fields all have the same meaning as previously described with respect to RIP-1 (RFC 1058.) Version field 162 is set to 2 for RIP-2.

In RIP-2, if a message 184 is for authentication, then the address family identifier field 166 of the first entry 188 (and only the first entry) is set to 0xFFFF and the remainder of the entry (including fields 168–176) contains the authentication.

Route tag 168 is an attribute assigned to a route which is preserved and readvertised with a route, and provides a method of separating internal RIP routes (routes for networks within the RIP routing domain) from external RIP.

Subnet mask 172 contains the subnet mask which is applied to the IP address 170 to yield the non-host portion of the address. If mask 172 is zero, no subnet mask is included. In accordance with RIP-2, on an interface where a RIP-1 router may hear and operate on the information in a RIP-2 routing entry, information internal to one network must never be advertised into another network, information about a more specific subnet may not be advertised where RIP-1 routers would consider it a host route, and supernet routes must not be advertised where they could be misinterpreted by RIP-1 routers.

Next hop field 174 contains the immediate next hop IP address to which packets to the destination specified by this route entry should normally be forwarded (this is an advisory field, and may be ignored.) Specifying a value of 0.0.0.0 in this field indicates that routing should be via the originator of the RIP advertisement. The purpose of the next hop field 174 is to eliminate packets being routed through extra hops in the system.

In order to reduce unnecessary load on those hosts which are not listening to RIP-2 messages, an IP multicast address 170 of 224.0.0.9 serves as an IP multicast address. Periodic multicast broadcasts are inter-router messages which are not forwarded.

If a RIP-2 router receives a RIP-1 request, it responds with a RIP-1 response; however, if the router is configured to send only RIP-2 messages, it does not respond.

Referring further to FIG. 1, in accordance with the invention, to minimize undesired routing traffic through gateway 100, redistribution control is implemented such that routes received on LANs, such as 120, will be redistributed to all other interfaces 133, 135, 137 and routes received from WANs, such as WANs 122, 124, 126, will be redistributed only to LAN interfaces, such as LAN 120 interface 131, and to the other WANs (zero or more of WANs 122, 124, 126) that the route was received from.

In accordance with a preferred embodiment of the invention, all wide area network interfaces 133, 135, 137 are labeled with a redistribution flag of *limited or *full. Default is *limited. Thus, when knowledge of a route to remote office 114 comes from router 102 to router 100, router 100 labels it *limited, and because router 104 is on WAN 126, router 100 will not advertise to router 104 over WAN 126 that it (router 100) knows the route to remote office 114. As a result, router 104 will not send datagrams to remote office 114 through router 100, but will rather use a route through WAN 128.

Further, all local area networks (LANs) are labeled with a redistribution flag of *full. Thus, knowledge of LANs 120 on interface 131 will be advertised to routers 102 and 104 over interfaces 133, 135 and 137. Thus, remote offices 114 and 116 can communicate with offices 110 and 112.

Any knowledge that is learned by router 100 on a WAN 133, 135, 137 is restricted to other networks labeled *full. By default, these are restricted to LANs, such as LAN 120. However, a system administrator can override the *limited configuration for a particular WAN to *full, and thus allow full knowledge of learned routes to be advertised to it.

Referring to FIG. 5, in a preferred embodiment, an interface configuration table 140 is provided with an entry for each interface 131, 133, 135, 137 including the interface name 216, an interface type field 212 set to LAN or WAN, a redistribution bit mask 210 and a "distribute routes in" (DRI) field 214 configured to *FULL, *LIMITED, or *CALC.

Metric 217 specifies the metric that is to be added to routes received through the specified interface and, in this embodiment, is a number between 1 and 15.

Community 219 specifies the community name used by this interface for authentication purposes. If a community name is not specified, then authentication is not indicated for this interface.

Forwarding parameters 215 includes zero to N parameters including block, forward, forward.cond and noforward. Block prevents network routes received on the specified interface from being included in the routes table 138. Hence, network is not known and not forwarded to any other routers. Forward indicates that network routes are to be forwarded over the specified interface unless the interface is inactive. Forward.cond indicates that network routes are to be forwarded over the specified interface unless the interface is inactive, in which case they are to be forwarded over all other interfaces. Noforward indicates that network routes are not to be forwarded over the specified interface. Multiple occurrences of forwarding parameters 215 may occur, and these will be processed in the order supplied, with the first parameter encountered which allows the route to be sent over the specified interface ending the processing. The default is to not forward.

RIP interface name 216 specifies the RIP interface on host 100 this statement, or entry in table 140, pertains to. It may include a network, specified as an IP address and a mask or an IP address and a bit_number, where the bit number n indicates which bit in the 0 . . . n bits of the IP address (counting left to right) is the last bit of the network portion of the IP address; or as an interface name, which is a logical interface name used to identify a PPP interface which will have an IP address assigned dynamically at the time PPP connection becomes active; or as a host name; or as *, which is used to refer to all interfaces 131, 133, 135, 137 on host 100 to set default values that can be overridden by providing a RIP interface statement, or entry in configuration table 140 for a specific interface with different values for selected parameters.

Distribute routes in 214 controls how routes received from this RIP interface 216 (network) are to be redistributed by router 100 to wide area networks such as WANs 122, 124, 126. This parameter 214 does not affect redistribution of routes to local area networks, such as LAN 120. If DRI 214 is *CALC, a *full or *limited will be calculated by router 100 based on whether the rip interface network is local (e.g., a token ring LAN) or not (e.g., a WAN.) If the specified interface is broadcast capable, it is assumed to be local and a value of *full is given. Otherwise, the value is *limited. *Full would normally only be specified for local area networks. *Full indicates that the routes received from the specified interface are to be redistributed to all other interfaces using normal RIP algorithms. *Limited normally is only specified for some type of wide area network, and indicates the routes received from the RIP interface network are not to be redistributed to other *limited interfaces (that is, to *limited interfaces other than the interface from which the route is received.)

If the DRI field 214 is set to *FULL, then the redistribution bit mask 210 will be set to all ones. If the DRI field 214 for an interface is set to *LIMITED, then the redistribution bit mask 210 will have a unique bit set to 1. The default setting for the DRI field 214 is *CALC. In this case, if the interface type 212 is LAN the bit mask setting 210 will be all ones (1). In the case of an interface type 212 of WAN, bit mask 210 will be a unique bit set to 1.

Subnet masks are used to determine network addresses as follows. The IP address and subnet mask are ANDed to determine the network. For example, if the IP address is 10.5.6.7 (hex 0A 05 06 07) and the subnet mask 255.255.255.0 (hex FF FF FF 00), these are ANDed to give 10.5.6.0 as the subnet address. Valid address on this subnet are 10.5.6.0 through 10.5.6.253.

A passive/supply 218 value set to passive indicates that no RIP traffic is received and no RIP traffic is generated on the specified interface. A passive/supply 218 value set to supply indicates which type of routing information to supply to neighboring routers via RIP. If supply 218 is set to RIP1, both RIP version 1 and RIP version 2 messages will be recieved on the specified interface and RIP version 1 messages will be sent. If supply 218 is set to RIP2, both RIP version 1 and RIP version 2 messages will be received on the specified interface and RIP version 2 messages will be multicast on the specified interface. If supply 218 is set to off, both version 1 and version 2 RIP messages will be received, but no RIP packets will be sent.

In accordance with a preferred embodiment of the invention, a RIP_INTERFACE statement is used to specify all routing related options that are configured on a per-interface basis. Multiple interface options can be specified on a single entry in configuration file 140, provided that only one of those options that require a destination address appears on a given statement. For example, a statement could use he forward and metric options on a single line, but the forward and noforward options could not appear on the same line. Preferably, multiple lines are used to specify multiple options for a given interface.

In operation, as routes are read in to routing table 138, interface bit mask 210 from the configuration table 140 entry for the interface (133, 135, 137 or 131) from which the routing information statement 184 is received is ORed with the subnet bit mask 172 to give routing bit mask 232, which is an indication of which interface the routes were learned from. When routes are to be advertised, the redistribution bit mask 210 of interface (133, 135, 137, 131) over which the routes are being advertized is ANDed with the routing bit mask 232 of each route in route table 138. If there is a match, the routes will be sent out. If there is no match, the route will not be sent out.

In further description of the operation, let the redistribution bit masks 210 for each of the interfaces 131, 133, 135, 137 be is shown in FIG. 1. That is, the bit mask 210 entry for interface 133 to WAN 122 is equal to 0001, for interface 135 to WAN 124 is 0010, for interface 137 to WAN 126 is 0100, and for interface 131 to LAN 120 is 1111. If the interfaces are at default, the route to router 102 will be received from WAN 122 and WAN 124, the route to router 104 will be received from WAN 126, and the route to router 106 will be received through LAN 120. The routes will be advertised in the following manner: the route to router 102 will be advertised to WANs 122, 124 and LAN 120; the route to router 104 will be advertised to WAN 126 and LAN 120; and the route to router 106 will be advertised to WANs 122, 124, 126 and LAN 120.

Figure 6:
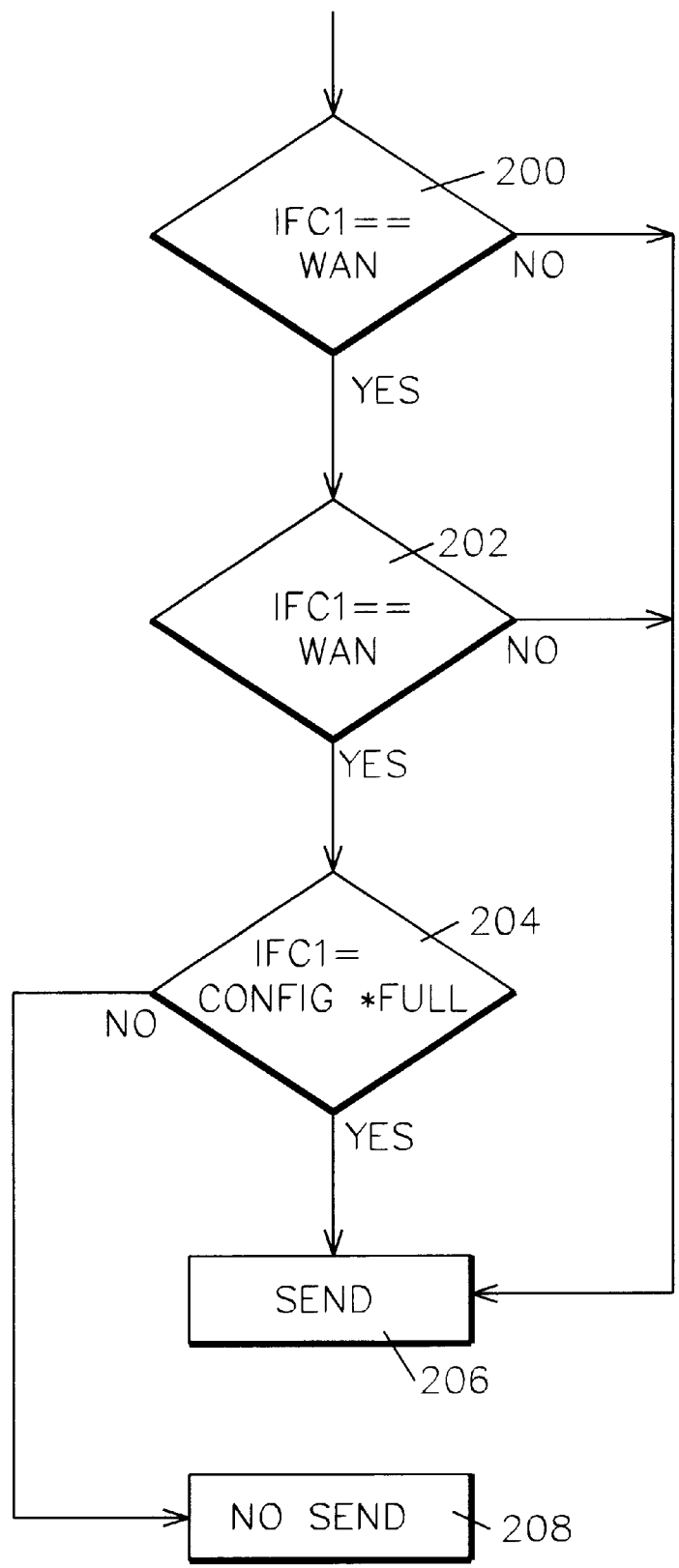
FIG. 6 is a flow diagram illustrating the steps of the invention for minimizing undesired routing traffic through the host gateway 100 of FIG. 1.

Referring to FIG. 6 and Table 1, this operation is further illustrated, where IFC1 refers to the interface configuration table 140 interface type 212 for interface 1 (the interface over which the routing table 138 entry for this route was received, and is one of interfaces 131, 133, 135, 137) and where IFC2 refers to the interface type 212 for interface 2 (the interface over which advertisement is to be sent, also one of interfaces 131, 133, 135, 137.)

TABLE 1

Route Advertisement

| | |
|---|---|
| IF (IFC1 == WAN) & (IFC2 == WAN) | |
|   IF IFC1 = CONFIG *FULL | |
|     SEND | |
|   ELSE | |
|     NO SEND | */ THIS IS THE DEFAULT, WANS WERE |
| | */ NOT CONFIGURED |
| ELSE | */ EITHER IFC1 OR IFC2 IS |
| | */ NOT A WAN |
|   SEND; | |

In step 200, it is determined for this entry in table 138 if the interface IFC1 over which this entry was received is configured in field 212 as a WAN; if not, it is a LAN 120, and in step 206 the route is advertised to interface IFC2. If EFC1 is a WAN, then in step 202 the interface to which the route is to be advertised is checked to see if it is a WAN; if not, then in step 206 the route is advertised to interface IFC2; else, if so, in step 204 the distribute routes in (DRI) field 214 for the interface over which this entry was received is checked. If field 214 is *FULL, then in step 206 this route is advertised to interface IFC2; else, if not *FULL, in step 208 the route is not advertised to interface IFC2.

The effect of this operation is to force datagrams between routers 102 and 104 to take a route through WANs 128 rather than router 100, while allowing datagrams to or from LAN 120 with respect to routers 102 and 104 to take the path through router 100.

Advantages Over the Prior Art

It is an advantage of the invention that an improved method and system is provided for operating a host computer as a router in a RIP system while limiting the communication of datagrams through the host. It is a further advantage of the invention that the communication of datagrams by way of a route through a particular gateway having a relatively lower metric is limited so as to avoid overuse of that gateway by increasing usage of routes with higher metrics.

It is a further advantage of the invention that a router is enabled to support a RIP environment implementing a distance vector algorithm while restricting routes through that router.

It is a further advantage of the invention that a method and system is provided for supporting a gateway implementing a routing information protocol (RIP) based upon a least cost algorithm for exchanging routing information while restricting routes through that gateway between wide area network interfaces.

Alternative Embodiments

It will be appreciated that, although specific embodiments of the invention have been described herein for purposes of illustration, various modifications may be made without departing from the spirit and scope of the invention. In particular, while the preferred embodiment has been described primarily in the context of its use in a RIP router, as will be apparent to those skilled in the art, it may be used in the context of other like routing protocols.

Clearly, any computing system capable of interfacing to a network may be configured to operate as a router operable in accordance with this invention, including but not limited to those which are configured according to the ISO networking model. Such systems include, for example, the IBM AS/400 system, and also the IBM System/390 computing system, and the IBM Personal Computer. Further, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method for operating a host as a gateway interfacing a plurality of network interfaces in a communication system, comprising the steps of:

maintaining in a configuration file a redistribution parameter for each of said plurality of network interfaces;

defaulting said redistribution parameter to *full for local area network interfaces;

defaulting said redistribution parameter to *limited for wide area network interfaces;

responsive to receiving a routing from a wide area network interface, advertising said routing to interfaces having a redistribution parameter of *full and not to those interfaces having a redistribution parameter of *limited.

2. The method of claim 1, comprising the further step of:

overriding the *limited redistribution parameter for a specified wide area network interface to *full.

3. Method for operating a host as a gateway interfacing a plurality of network interfaces including IFC1 and IFC2 in a communication system, where WAN refers to a wide area network, LAN refers to a local area network and CONFIG *FULL refers to a configuration parameter designating an interface as one to receive routing messages and CONFIG *LIMITED refers to a configuration parameter designating a wide area interface as one not to receive routing messages, the method for determining if a routing message received on IFC2 is to be sent (SEND) to an interface IFC1, comprising the steps of:

```
IF (IFC1 == WAN) & (IFC2 == WAN)
    IF IFC1 = CONFIG *FULL
        SEND
    ELSE */ IFC1 = CONFIG *LIMITED
        NO SEND
ELSE */ (IFC1 == LAN) & (IFC2 == LAN)
    SEND.
```

4. Method for operating a host as a gateway interfacing a plurality of network interfaces including at least one local area network and at least one wide area network, comprising the steps of:

redistributing knowledge of first routes received from local area networks to all other interfaces; and redistributing knowledge of second routes received from wide area networks only to local area network interfaces and conditionally upon customer configuration per wide area network interface to the other wide area networks from which knowledge of said second routes was received.

5. Method for operating a host as a gateway interfacing a plurality of network interfaces including at least one local area network and at least one wide area network, comprising the steps of:

maintaining in an interface configuration table a configuration entry for each said interface, said configuration entry including an interface type indicia identifying said interface as a local area network or a wide area network, a redistribution bit mask, and a distribute routes in indicia;

maintaining in a routing table an entry for each of a plurality of routes known to this gateway, said routing entry including a destination IP address, a routing bit mask, responsive to receiving from a first network interface knowledge in a message including a subnet mask of a route to a first destination, selectively updating said routing table with an entry for said first destination including a routing bit mask determined by ORing said subnet mask and said redistribution bit mask; and thereafter advertising said route to said first destination selectively to those network interfaces for which said redistribution bit mask and said routing bit mask match.

6. A gateway interfacing a plurality of network interfaces including at least one local area network and at least one wide area network, comprising:

means for redistributing knowledge of first routes received from local area networks to all other interfaces; and means for redistributing knowledge of second routes received from wide area networks only to local area network interfaces and conditionally upon customer configuration per wide area network interface to the other wide area networks from which knowledge of said second routes was received.

7. A gateway interfacing a plurality of network interfaces including at least one local area network and at least one wide area network, comprising:

an interface configuration table including a configuration entry for each said interface, said configuration entry including an interface type indicia identifying said interface as a local area network or a wide area network,
a redistribution bit mask, and
a distribute routes in indicia;
a routing table including a routing entry for each of a plurality of routes known to this gateway, said routing entry including
a destination IP address,
a routing bit mask,
means responsive to receiving from a first network interface knowledge in a message including a subnet mask of a route to a first destination for selectively updating said routing table with an entry for said first destination including a routing bit mask determined by ORing said subnet mask and said redistribution bit mask; and
means for advertising said route to said first destination selectively to those network interfaces for which said redistribution bit mask and said routing bit mask match.

8. Apparatus for storing signals for controlling the operation of a digital computer as a gateway interfacing a plurality of network interfaces including at least one local area network and at least one wide area network, said signals comprising:

first redistribution signals for operating said digital computer to redistribute knowledge of first routes received from local area networks to all other interfaces; and second redistribution signals for operating said digital computer to redistribute knowledge of second routes received from wide area networks only to local area network interfaces and conditionally upon customer configuration per wide area network interface to the other wide area networks from which knowledge of said second routes was received.

9. A digital transmission link for transmitting signals for controlling the operation of a digital computer as a gateway to a plurality of networks including at least one local area network and one or more wide area networks, said signals comprising:

first redistribution signals for operating said digital computer to redistribute knowledge of first routes received from local area networks to all other interfaces; and second redistribution signals for operating said digital computer to redistribute knowledge of second routes received from wide area networks only to local area network interfaces and conditionally upon customer configuration per wide area network interface to the other wide area networks from which knowledge of said second routes was received.

10. A memory device for storing signals for structuring the components of a digital computer to operate as a gateway interfacing a plurality of network interfaces including at least one local area network and at least one wide area network, said gateway comprising:

means for redistributing knowledge of first routes received from local area networks to all other interfaces; and means for redistributing knowledge of second routes received from wide area networks only to local area network interfaces and conditionally upon customer configuration per wide area network interface to any other wide area network from which knowledge of said second routes was received.

* * * * *